United States Patent
Hutchins

(10) Patent No.: US 6,366,681 B1
(45) Date of Patent: Apr. 2, 2002

(54) ANALYSIS OF MULTI-SPECTRAL DATA FOR EXTRACTION OF CHLOROPHYLL CONTENT

(75) Inventor: Kevin S. Hutchins, Boulder, CO (US)

(73) Assignee: Space Imaging, LP, Thornton, CO (US)

( * ) Notice: Subject to any disclaimer, the term of this patent is extended or adjusted under 35 U.S.C. 154(b) by 0 days.

(21) Appl. No.: 09/287,605

(22) Filed: Apr. 7, 1999

(51) Int. Cl.[7] .................................................. G06K 9/00
(52) U.S. Cl. ........................................ 382/110; 382/191
(58) Field of Search ................................ 382/100, 128, 382/141, 162, 163, 168, 190, 191, 194, 195, 210, 225, 276, 302; 348/33, 86, 135, 207, 218, 235, 236, 237, 266, 270, 271, 438.1

(56) References Cited

U.S. PATENT DOCUMENTS

| | | | |
|---|---|---|---|
| 3,748,471 A | * 7/1973 | Ross et al. | 250/333 |
| 3,752,914 A | 8/1973 | England et al. | 348/32 |
| 5,055,679 A | * 10/1991 | Ninomiya et al. | 250/306 |
| 5,353,053 A | * 10/1994 | Nishioka et al. | 348/33 |
| 5,412,219 A | * 5/1995 | Chappelle et al. | 250/461.1 |
| 5,677,532 A | * 10/1997 | Duncan et al. | 250/339.15 |
| 5,764,819 A | 6/1998 | Orr et al. | 382/110 |
| 5,784,162 A | * 7/1998 | Cabib et al. | 356/456 |
| 5,859,700 A | * 1/1999 | Yang | 356/300 |
| 6,160,617 A | * 12/2000 | Yang | 356/300 |
| 6,160,902 A | * 12/2000 | Dickson et al. | 382/110 |
| 6,212,824 B1 | * 4/2001 | Orr et al. | 47/58 |

* cited by examiner

Primary Examiner—Andrew W. Johns
Assistant Examiner—Shervin Nakhjavan
(74) Attorney, Agent, or Firm—Holland & Hart llp

(57) ABSTRACT

Analysis of multi-spectral data for extraction of chlorophyll content. Multi-spectral data is obtained from an imaging device. The multi-spectral data contains spectral response data for chlorophyll and background data. The background data is removed from the multi-spectral data to isolate the spectral response due only to chlorophyll. This is then presented as a chlorophyll absorption feature which may be analyzed by measuring the width of the feature, the surface area of the feature, or measuring various angular changes of the feature. These measurements may than be used for a variety of purposes including plant health analysis.

19 Claims, 14 Drawing Sheets

ANALYSIS OF MULTI-SPECTRAL DATA FOR EXTRACTION OF CHLOROPHYLL CONTENT

BACKGROUND OF THE INVENTION

A. Field of the Invention

The present invention pertains generally to the analysis of spectral data and more particularly to assessing the health of plants through the use of spectral data that detects and analyzes the chlorophyll content in plant leaves.

B. Description of the Background

Determining and predicting crop health has been a goal of growers for centuries. As science has progressed, methods of assessing crop health have improved. In addition, as technology has advanced, new methods to assess crop health have arisen. With the advent of imaging technology, a variety of vegetation indices have been developed. Currently used vegetation indices are a function of vegetation cover, plant density, and plant health. However, vegetation indices may not accurately represent plant chlorophyll content or plant health. Moreover, vegetation indices are also a function of noise such as soil type, viewing angle of the imaging device, atmospheric conditions, the incident angle of the light source, and other background absorbers. Thus, vegetation indices only generally represent these properties. This severely undermines the usefulness of vegetation indicies, automated analysis and detection of a change in plant health.

In assessing vegetation indices, the ultimate goal is to find a methodology capable of deriving plant biophysical properties in a way which is:

representative of the plant physiology and, in some cases, pathology robust against variations in soil background, plant type, environmental conditions, and geographic location normalized for automated analyses The best known vegetation index is called the Normalized Difference Vegetation Index (NDVI) and is computed as follows:

$$NDVI=[NIR-Red]/[NIR+Red] \quad (1)$$

NIR is the near-infrared band that is detected by a sensor or camera system. Red is the red band detected by another sensor or camera system. NDVI is dimensionless and is normalized to have values between $-1$ and $1$. The physical interpretation of NDVI is simple. $NDVI<0$ may be attributed to features other than vegetation. These objects may be, for example, man-made features or water bodies. Values of $NDVI>0$ may be attributed to vegetation, with higher values indicative of greater health and/or vegetation cover. However, NDVI is also a function of noise that can result from soil type, viewing angle of the imaging device, atmospheric conditions, the incident angle of the light source, and other background absorbers. Therefore, NDVI is only of marginal utility in assessing plant health. Moreover, NDVI does not allow for discrimination between plant health and a decrease in vegetation cover.

There are numerous derivative measures of NDVI designed to be somewhat less sensitive to noise. One of these is the Soil Adjusted Vegetation Index (SAVI). SAVI is computed as follows:

$$SAVI=[NDVI*L]/[1+L]. \quad (2)$$

where L is representative of the fractional vegetation cover. A value of $L=0.5$ is considered to be the most generic case. L may also be derived from a training set, e.g., a soil line, in which case the index is then called Modified SAVI (MSAVI), or from an initial soil image in which case the index is then called MSAVI2. However, since MSAVI and MSAVI2 are derivative measures of NDVI, they still suffer from many of the same limitations as NDVI.

As shown in equations (1) and (2), vegetation indices exploit the differences in the reflectance response between the red and NIR bands to extract plant information. As used herein, reflectance and absorption are used within this document, such that, reflectance refers to the amount of light reflected by a particular substance, while absorption refers, inversely, to the amount of light absorbed by a particular substance. Differences in reflectance of a plant at certain frequencies has been interpreted as indicative of chlorophyll content and plant health. However, the near-infrared reflectance is substantially invariant to chlorophyll content, so that the near-infrared information is not indicative of chlorophyll content or plant health. Moreover, the reflectance in the red band saturates quickly (decreases in sensitivity) with increasing chlorophyll content. Hence, any correlation that NDVI and its derivatives may have with chlorophyll content and plant health using the red band, is insensitive to small variations in chlorophyll content and plant health.

It would therefore be useful to have a measure that assesses chlorophyll content and plant health. Specifically, it would be desirable to have a single measure that discriminates between plant health and vegetation cover, that is insensitive to noise, that is normalized for automated analysis, and is sensitive to small changes in chlorophyll content. It is against this background and these problems and limitations that the present invention has been developed.

SUMMARY OF THE INVENTION

The present invention overcomes the disadvantages and limitations of the prior art by providing a chlorophyll based health map that is generally not affected by background data.

The present invention may therefore comprise a method for generating a chlorophyll based health map for a geographic area comprising the steps of: obtaining a multi-spectral image data set for the geographical area, the multi-spectral image data set including at least one spectra that responds to chlorophyll and at least two spectra which respond to background data; removing the background data from said multi-spectral image data set to create a chlorophyll absorption data set; and determining an amount of chlorophyll in the geographic region represented by the chlorophyll absorption data set.

The advantages of the present invention are that a chlorophyll based health map is capable of providing early detection of plant health due to the fact that the chlorophyll based health map is relatively insensitive to changes in background data and has great sensitivity to changes in certain chlorophyll concentrations. Additionally, the present invention has many applications in areas such as forestry, environmental monitoring and assessment and resource exploration.

DETAILED DESCRIPTION OF THE PREFERRED EMBODIMENT OF THE PRESENT INVENTION

Figure 1:
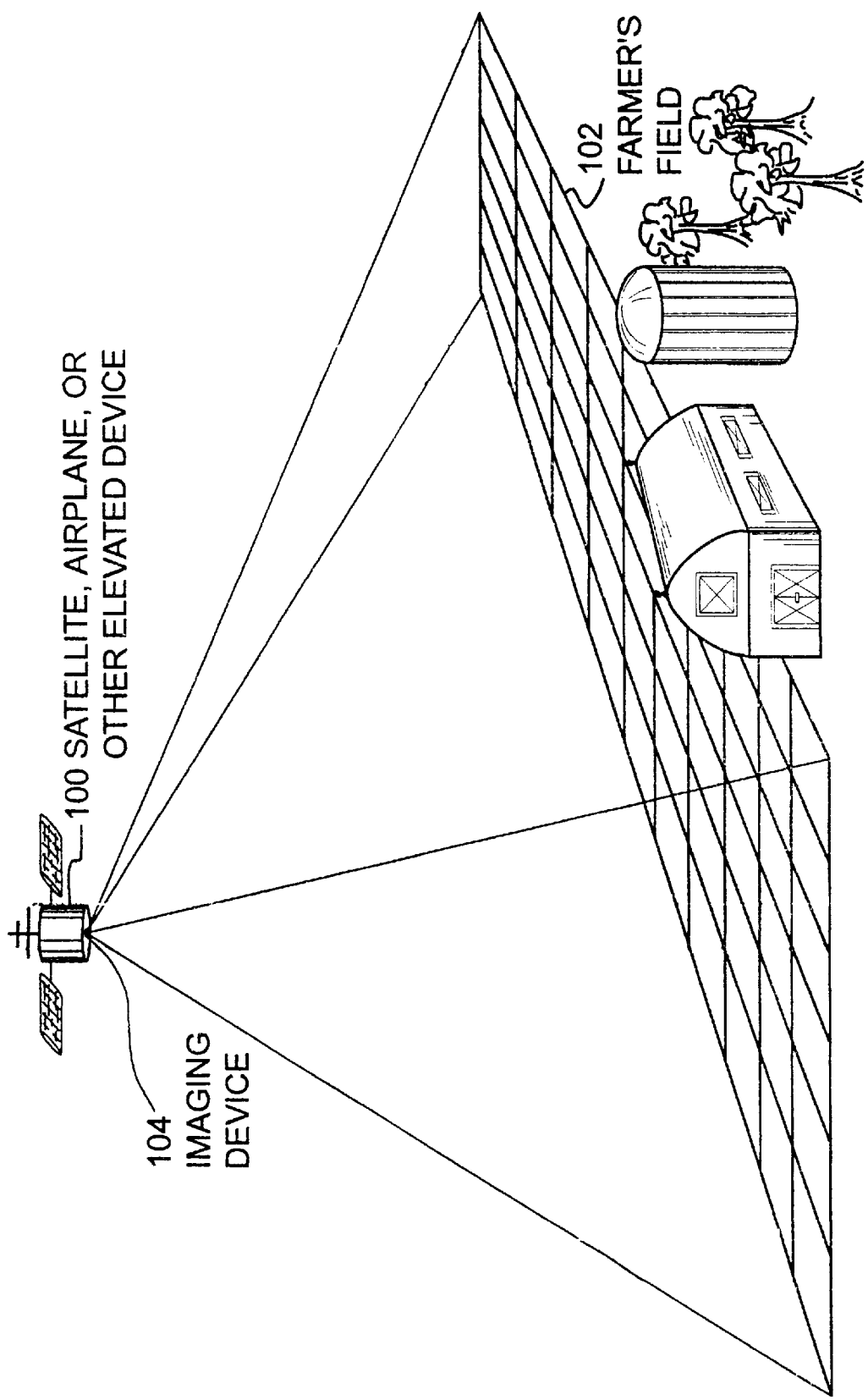
FIG. 1 is a schematic illustration of the manner in which the present invention may be implemented in a space based, airplane based, or generally elevated system.
Figure 1A:
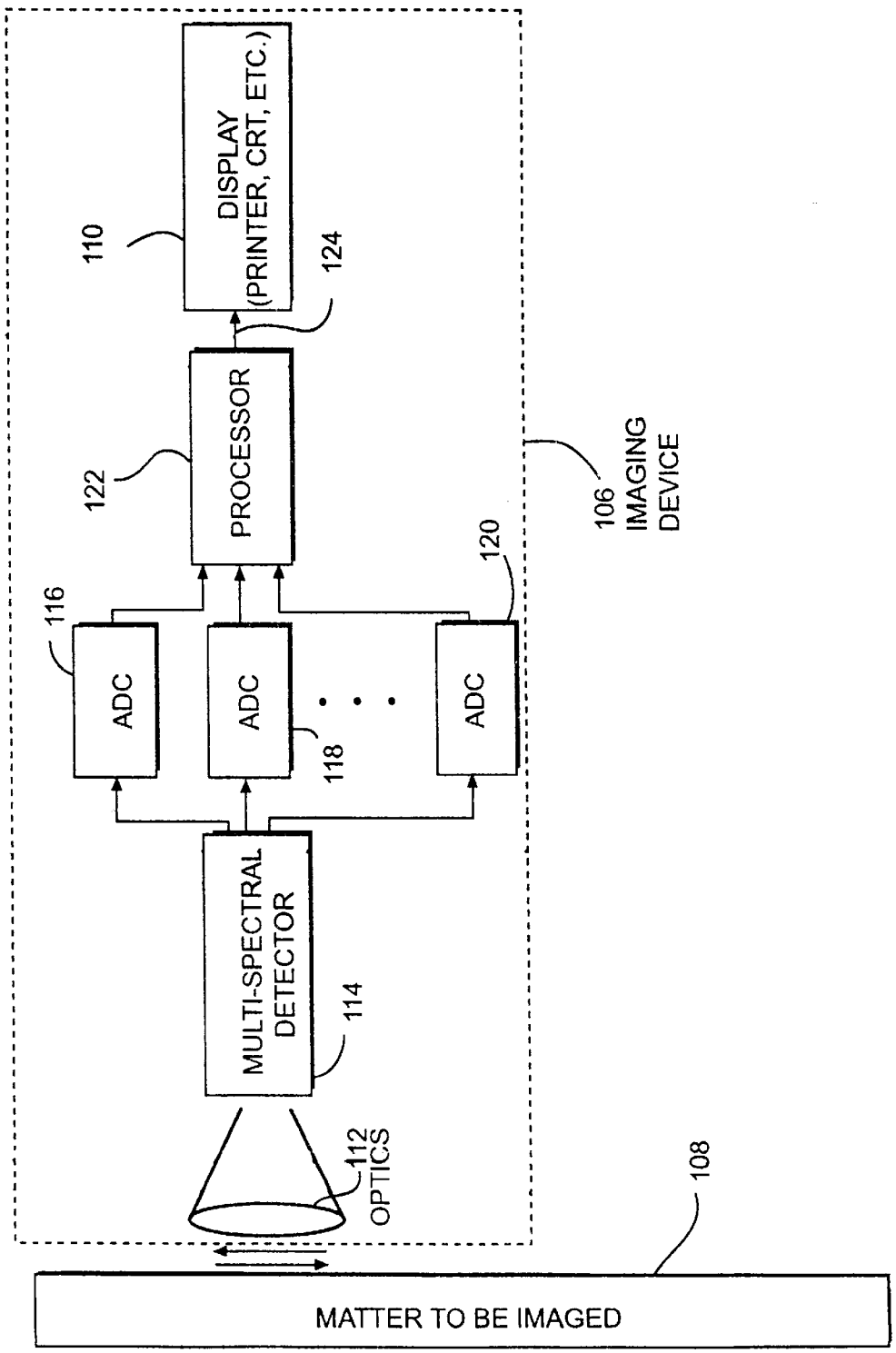
FIG. 1A is a schematic illustration of the manner in which the present invention may be implemented in general such as in a hand-held device.

FIG. 1 is a general illustration of one manner in which this invention may be implemented. As a satellite 100, airplane, or other elevated device passes over a farmer's field 102, an imaging device 104 (e.g. a set of digital cameras or CCD linear arrays) records a multi-spectral digital image of the farmer's field 102 that is represented as a matrix of pixels that correspond to an area having a predetermined size. For example, each pixel may represent a one meter by one meter area of the field 102. The multi-spectral image of the farmer's field is then processed in accordance with the current invention to yield a chlorophyll-based health map that the farmer may use to assess the health of the crops.

FIG. IA is a general Illustration of another manner in which this invention may be implemented. An imaging device 106 is used to record a multi-spectral image of some matter 108 that produces a spectral response. The multi-spectral image data is then processed in accordance with the present invention to yield a map that is Generated by display I10 that the user may use to assess certain attributes of the matter 108. As shown in Figure IA, device 106 may image plant matter. This may be achieved by allowing relative motion to be produced between the plant matter 108 and device 106. In this manner, a two dimensional matrix of pixels can be generated from linear CCD arrays. The device 106 may take many forms that produces relative motion between device 106 and the matter 108 that is being scanned including a portable or hand held device. Alternatively, two dimensional CD arrays can be used to capture an image without generating relative motion. The device 106 includes optics 112 that image the plant matter and focus that image on the multi-spectral detector 114. If it is desired to image high frequency radiation that cannot be focused with normal optics, aperture arrays may be utilized. As indicated above, the multi-spectral detector can comprise a series of linear CCD arrays or a matrix of two dimensional CCD arrays. The present invention may use four spectral bands, or any desired number of spectral bands, to detect the relative change of the spectral reflectants due to chlorophyll content in plant matter being imaged or the content of other materials having a spectral response in the matter being imaged. In accordance with the present invention it is beneficial to have at least two spectral bands that have very little or no spectral response to chlorophyll content so that a base line can be established for detecting changes as well as absolute values for chlorophyll content. Each of the spectral responses is sent to a separate analogue to digital converter such as analogue to digital converters 116, 118, 120. The digitized spectral signal is then sent to a processor 122 which processes the information to generate a display signal 124 that is displayed on display 110. It is contemplated that this invention can be utilized for various purposes to detect the chlorophyll content of the plant matter being imaged to discern the relative health of that plant matter. However, the overall concept of generating a baseline using two spectral frequencies that are non-responsive to a particular spectral response to be detected, and determining both an absolute value and relative change in that value to provide information with respect to the item being detected. In other words, this invention may have general applicability to a number of different implementations based upon the change in spectral response of the item being, detected.

In general, light is absorbed or reflected in differing degrees by different substances. The amount of the light absorption and the particular spectrum of light that is absorbed by a substance may be useful in analyzing the substance. If more than one spectrum of light is absorbed by a substance, this additional information is also useful. Also, combining the spectral response of a single substance for a plurality of spectra into a single measure may be useful. The present invention presents the spectral absorption of various types of cholorphyll in a single measurement, independent of the number of spectra of light absorbed by the substance.

Chlorophyll in plants absorbs light uniquely, e.g., different spectra of light is absorbed by chlorophyll differently. Chlorophyll content in plants is directly related to health. More specifically, as a plants' health increases or decreases, the amount of chlorophyll in the plant will increase or decrease accordingly. The preferred embodiment of the present invention is able to detect the chlorophyll content of plant in a single measurement. In that manner, a chlorophyll-based health map is can be generated to present this information.

As noted above, chlorophyll in plants absorbs light by differing degrees depending on the spectrum of light involved. Chlorophyll in leaves absorbs light at approximately the 380 nanometer wavelength region (the blue spectrum). In addition, chlorophyll in leaves absorbs light in approximately the 670 nanometer wavelength region (red spectrum). Chlorophyll in leaves also absorbs light at approximately the 540 nanometer wavelength region (the green spectrum). However, light is absorbed in the green spectrum to a lesser degree than in the red and blue spectrum. Chlorophyll type a is solely responsible for the absorption in the red spectrum. Both chlorophyll type a and b are responsible for absorption in the green spectrum. In contrast, chlorophyll in leaves absorbs practically no light in the near infrared spectrum.

Figure 2:
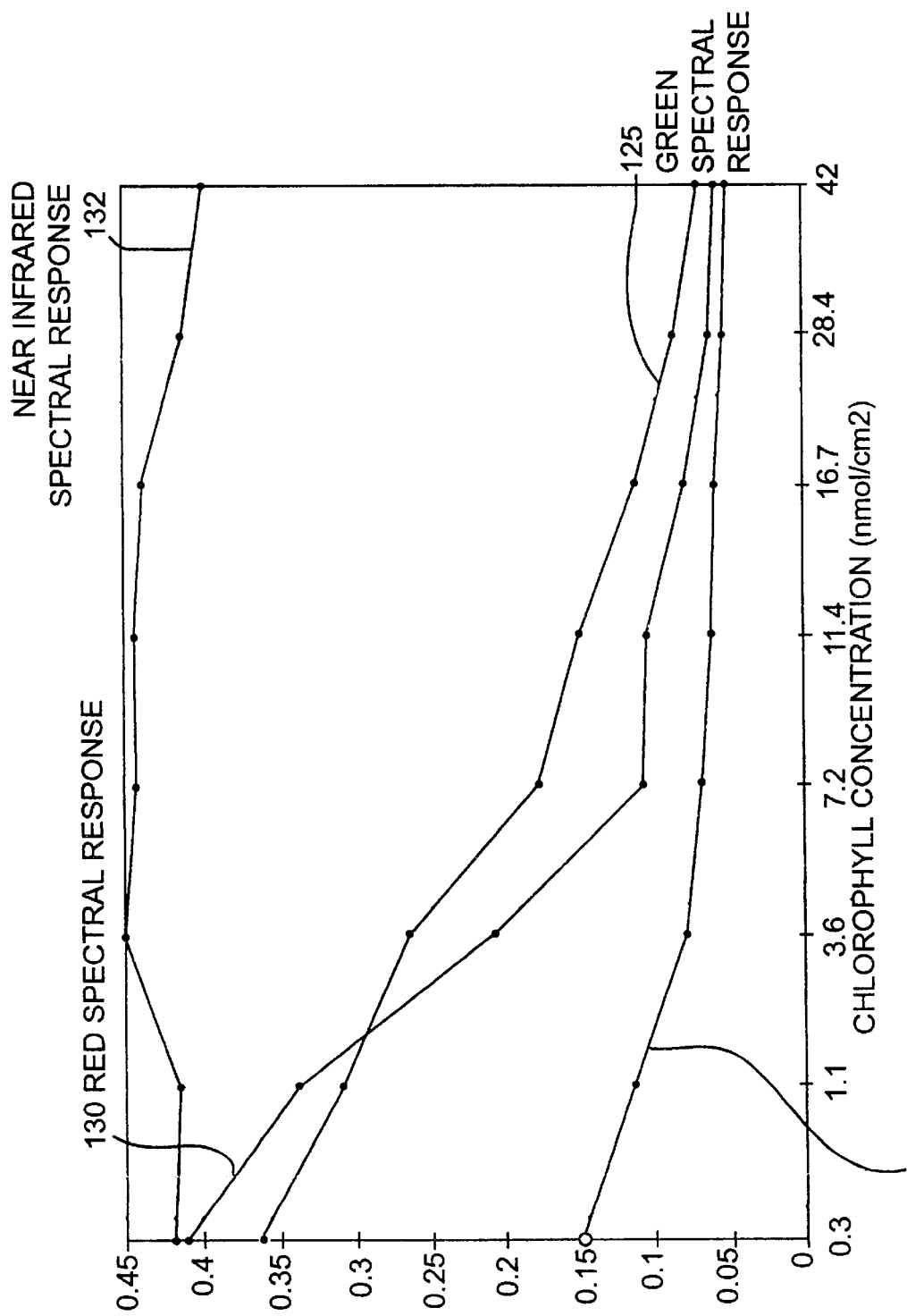
FIG. 2 is a graph of the reflectance response of the blue, green, red, and near infrared spectra as a function of chlorophyll concentration of plant matter.

FIG. 2 illustrates the reflectance of plants for specific spectral bands as a function of chlorophyll concentration (measured in nmol/cm2). FIG. 2 reveals how imaging technology may be utilized to focus on specific spectral bands of light to take advantage of the unique absorption characteristics of a 25 variety of substances in that spectrum of light. In the preferred embodiment, the blue spectral response 126 encompasses the 450–530 nanometer wavelengths, the green spectral response 125 encompasses the 520–610 nanometer wavelengths, the red spectral response 130 encompasses the 640–720 nanometer wavelengths, and the near infrared spectral response 130 encompasses the 770–880 nanometer wavelengths. In the preferred embodiment of the present invention, analyzing specific spectra of light and taking advantage of the differing ways that chlorophyll concentration absorbs light in these spectral bands allows for a robust measure of the health of a plant.

FIG. 2 also shows that the near-infrared spectral response 132 of plants is substantially independent of chlorophyll concentration. Therefore, the near infrared spectral response is not indicative of chlorophyll content or plant health. In addition, the blue spectral response 126 is mostly insensitive to changes in chlorophyll concentration. Certain portions of the blue spectrum do absorb chlorophyll as indicated above. However, measuring the absorption in the blue band due to chlorophyll is highly susceptible to atmospheric Rayleigh scattering. Chlorophyll absorption in the blue band is centered at about 380 nanometers. The preferred embodiment of the present invention focuses on the spectral absorption in the blue band centered at about 490 nanometers where there is very little absorption due to chlorophyll. This minimizes the changes in the blue spectral band due to both chlorophyll absorption and atmospheric Rayleigh scattering. Notwithstanding, the present invention may also be modified to utilize the chlorophyll absorption that occur in the blue band, if so desired.

As shown in FIG. 2, as chlorophyll concentration increases, the reflectance in both the green band 125 and red band 130 decrease (i.e., absorption increases). However, at concentrations greater than ~7.2 nmol/cm$^2$118, the red band 130 is less sensitive to chances in chlorophyll concentration. Therefore, vegetation indices that are functions of only the red and near infrared spectral response (i.e., SAVI and NAVI) are relatively insensitive to variations in chlorophyll concentration greater than 7.2 nmol/cm$^2$ i.e., these spectral bands become saturated. Alternatively, the green band spectral response 125 is sensitive to changes in the chlorophyll concentration across the full range of chlorophyll concentrations. The preferred embodiment of the present invention utilizes the differing reflectance characteristics of the red band 130 and the green band 125 to combine the most sensitive pieces of chlorophyll information into a single measurement. Moreover, the present invention allows the effects of soil variations to be minimized. In addition, the insensitivity of the blue band 126, centered at 490 nanometers, and the near infrared band 132 is utilized.

Generally, the preferred embodiment of the invention requires one spectral band that has a spectral response to chlorophyll concentration. In addition, the present invention requires at least two spectral bands that are relatively unresponsive to changes in chlorophyll concentration. Of the two bands that are unresponsive to chlorophyll changes one band should be from a lower spectra than the lowest spectra of the spectra responsive to chlorophyll, the second unresponsive spectrum should be from a higher spectrum than the highest of the spectra responsive to chlorophyll. For example, if the responsive band is at 550 nanometers then the unresponsive bands should be from a lower and higher spectra (e.g. 490 nanometers, 680 nanometers). This allows the spectral absorption to be presented in the form of an absorption feature described below.

Specific spectra are discussed above, i.e., the blue spectral response is for 450–530 nanometer wavelengths, the green spectral response is for the 520–610 nanometer wavelengths, the red spectral response is for the 640–720 nanometer wavelengths, and the near infrared spectral response is for the 770–880 nanometer wavelengths. These spectra are employed by the preferred embodiment of the invention. Generally, it is necessary for at least one spectrum to be absorbed by the Substance of interest (e.g. chlorophyll) to employ the general concepts of the present invention. In the preferred embodiment, two spectra that have a spectral response to chlorophyll are used (i.e. the screen spectral response at the 520–610 nanometer wavelength and the red spectral response at the 640–720 nanometer wavelength). However, greater than two spectra that are absorbed by some type of chlorophyll may be used. Moreover, in the preferred embodiment the two spectra that are absorbed by chlorophyll have different absorption characteristics. For example, referring to FIG. 2, the green spectral response 125 is consistently sensitive to changes in chlorophyll concentration whereas the red spectral response 130 saturates at approximately 7.2 nmol/cm$^2$ 118.

Digital imaging technology allows a digital image to be taken of each individual spectrum. This is accomplished through the use of a filter designed specifically to only allow the desired frequency of light to pass through the filter and be recorded. In addition, because the image is digitized, the various recorded spectra may be combined and/or manipulated in any way desired.

For a digital image to be useful in accessing chlorophyll data the background data in an image must be removed. For example, one pixel of the digital image may represent a 4 meter×4 meter surface (approximately 150 square feet) of a geographical area. Within that 4 m×4 m area there may be plants, soil, rocks, farm equipment, etc. To assess crop health according to the present invention the chlorophyll content in the plants is most important. Hence, the background data is removed to reveal the data associated with chlorophyll absorption.

Removal of the background data is also referred to spectral continuum removal. The theoretical basis for spectral continuum removal is Beer's law. Beer's law describes the probability for light attenuation within a particular substance as a function of the material absorption coefficient and the distance traveled by photons within the material.

(1) Beer's law $$I(\lambda) = I_0(\lambda) e^{-kx};$$

where
I=measured intensity
$I_0$=incident intensity k=absorption coefficient x=distance within material traveled by photon (estimated by mean optical path)

λ=wavelength

Thus, the mean optical path and the absorption coefficient can be used to describe light interaction with a pure material (e.g. chlorophyll) at a given wavelength (i.e. red, blue, green, near-infrared).

(2) Spectral Relectance (single material)

$$\rho(\lambda) = \frac{I}{I_0} = e^{-kx}$$

For light interactions with intimate mixtures (e.g. soil, plant, and rock), the optical properties of the mixture can be estimated using a linear combination of the optical properties of the individual materials. As the measured reflectance from a surface represents the total probability of light attenuation, each component represents a multiplicative contribution of the total probability.

(3) Probability of Attenuation or Absorption (intimate mixture of materials)

$$\rho continuum^{(\lambda)} = e^{-\bar{k}(\lambda)\bar{x}(\lambda)} = e - \sum_{i=1-n} k_i x_i = e^{-k_1 x_1} e^{-k_2 x_2} \ldots e^{-k_n x_n};$$

where $\bar{k}$, $\bar{x}$=bulk material optical properties Thus, to remove the spectral continuum or background information, we divide the derived spectral reflectance into the measured reflectance continuum.

(4) Continuum Removal $$\gamma(\lambda) = \frac{\rho_{chlorophyll}(\lambda)}{\rho_{continuum}(\lambda)} = \text{Spectral absorption due to the presence of chlorophyll}$$

Thus, once the background is removed the remaining normalized spectrum will vary with chlorophyll content. Normalization refers to the fact that spectral absorption due to chlorophyll is constrained to a value between zero and one. If no chlorophyll content is present the reflectance due to chlorophyll will not exist and therefore according to equation (4) the spectral reflectance will equal one (1/1=1). If, on the other hand, the reflectance due to chlorophyll is 100% the spectral absorption will equal zero (0/1=0). This normalization is not image specific, unlike NDVI, providing for enhanced automated analysis and change detection. One way to present the normalized spectrum is as a chlorophyll absorption feature ("CAF"). Generally, the CAF is a function of the absorption in the spectrum or spectra that are responsive to chlorophyll content. In the preferred embodiment, the CAF is a function of the absorption due to chlorophyll in the green and red spectra.

Figure 3:
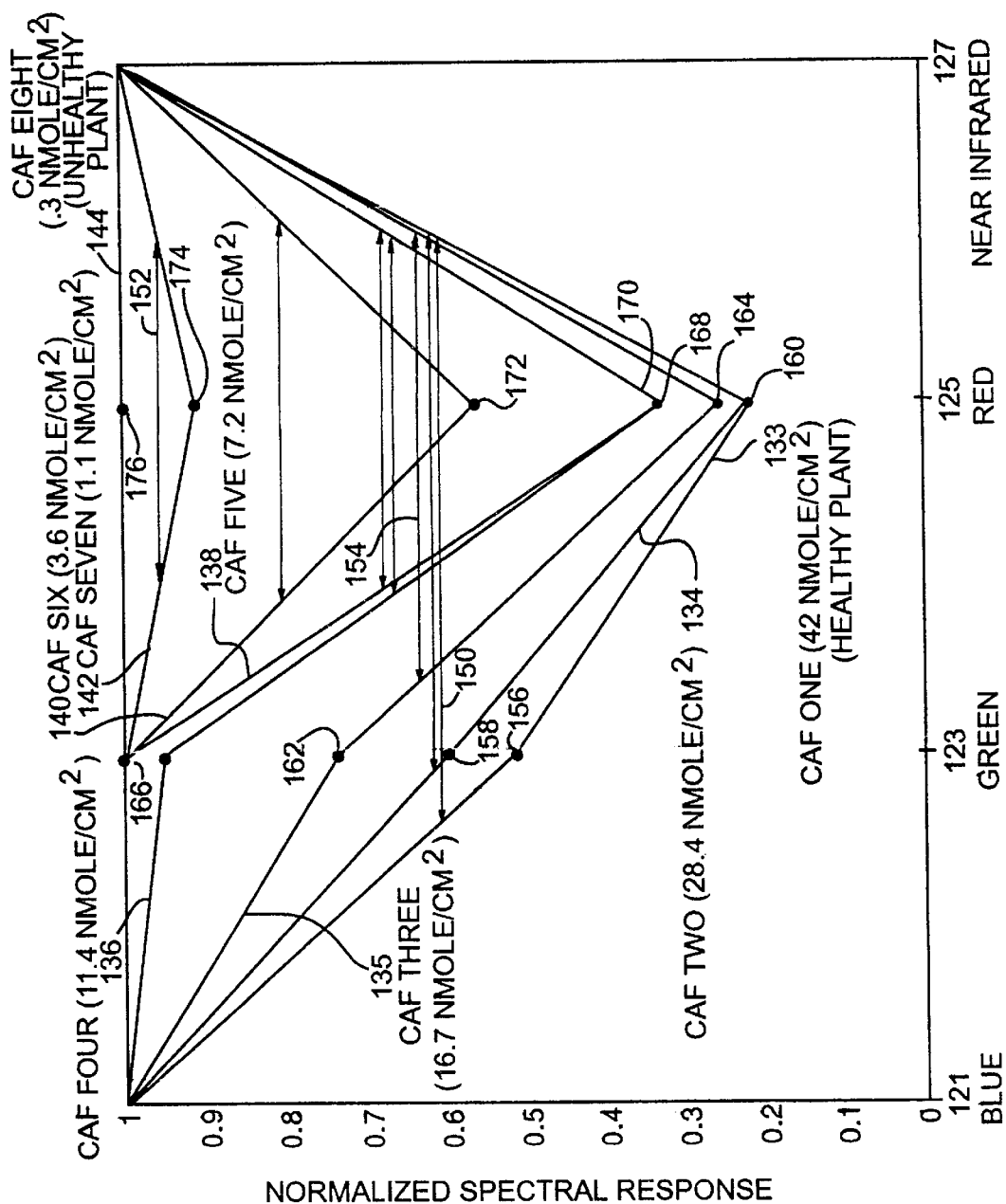
FIG. 3 is a graphical illustration of a set of chlorophyll absorption features (CAF) and corresponding full-width half-maximum (FWHM) measurements emphasizing the manner in which the CAF and FWHM vary as the health of a plant changes.

FIG. 3 shows a series of chlorophyll absorption features (CAFs). These chlorophyll absorption features refer to actual chlorophyll concentrations in Maple leaves. Note, the spectral response for the green band 123 and the red band 125 varies from CAF to CAF depending on chlorophyll concentration of the plant matter for that particular CAF. However, the blue band 121 and the near infrared band 127 do not vary. This result is consistent with the discussion of FIG. 2 which shows the reflectance response for the blue 126, green 125, red 130, and near infrared 132 spectra. In addition, note that both FIG. 3 and FIG. 4 include the Full-Width Half-Maximum (FWHM) shown by a horizontal line with arrows on either end. The FWHM is discussed below.

CAF ONE 133 refers to a chlorophyll absorption feature for a healthy vigorous plant having a chlorophyll concentration of 42 nmol/cm$^2$. CAF EIGHT 130 refers to a very unhealthy plant. The Chlorophyll absorption features between CAF ONE 133 and CAF EIGHT 144 represent plants with varying degrees of health. As discussed with respect to FIG. 2, the green band response 125 (FIG. 2) consistently changes from very low concentrations of chlorophyll to high concentrations of chlorophyll. However, the red response 130 (FIG. 2) is not consistent. The red band is relatively unresponsive to concentrations of chlorophyll greater than 7.2 nmol/cm$^2$. The different reflectance responses of the green and red bands are highlighted in the different shapes of the CAFs shown in FIG. 3. CAF TWO 134 is the CAF for a plant with 28.4 nmol/cm$^2$ chlorophyll concentration. The health of the plant or plants represented in CAF TWO 134 is decreasing with respect to the plant health shown by CAF ONE 133. As expected the green response changes from 0.5 at 156 to 0.6 at 158 for CAF ONE and CAF TWO while the red response stays about the same as shown at 160. The same can be said with respect to the change in spectral response from CAF TWO 134 at 158 (green response) and 160 (red response) when compared to CAF THREE 135 at (green response) and 164 (red response). The same is generally true for all of the changes through CAF FIVE 138 at 166 (green response) and 168 (red response) which refers to a plant with a chlorophyll concentration of 7.2 nmol/cm$^2$. However, the change from CAF FIVE 138 at 170 (red response) when compared to CAF SIX 140 at 172 (red response), CAF SEVEN 142 at 174 (red response), and CAF EIGHT 144 at 176 is dramatic.

Figure 12:
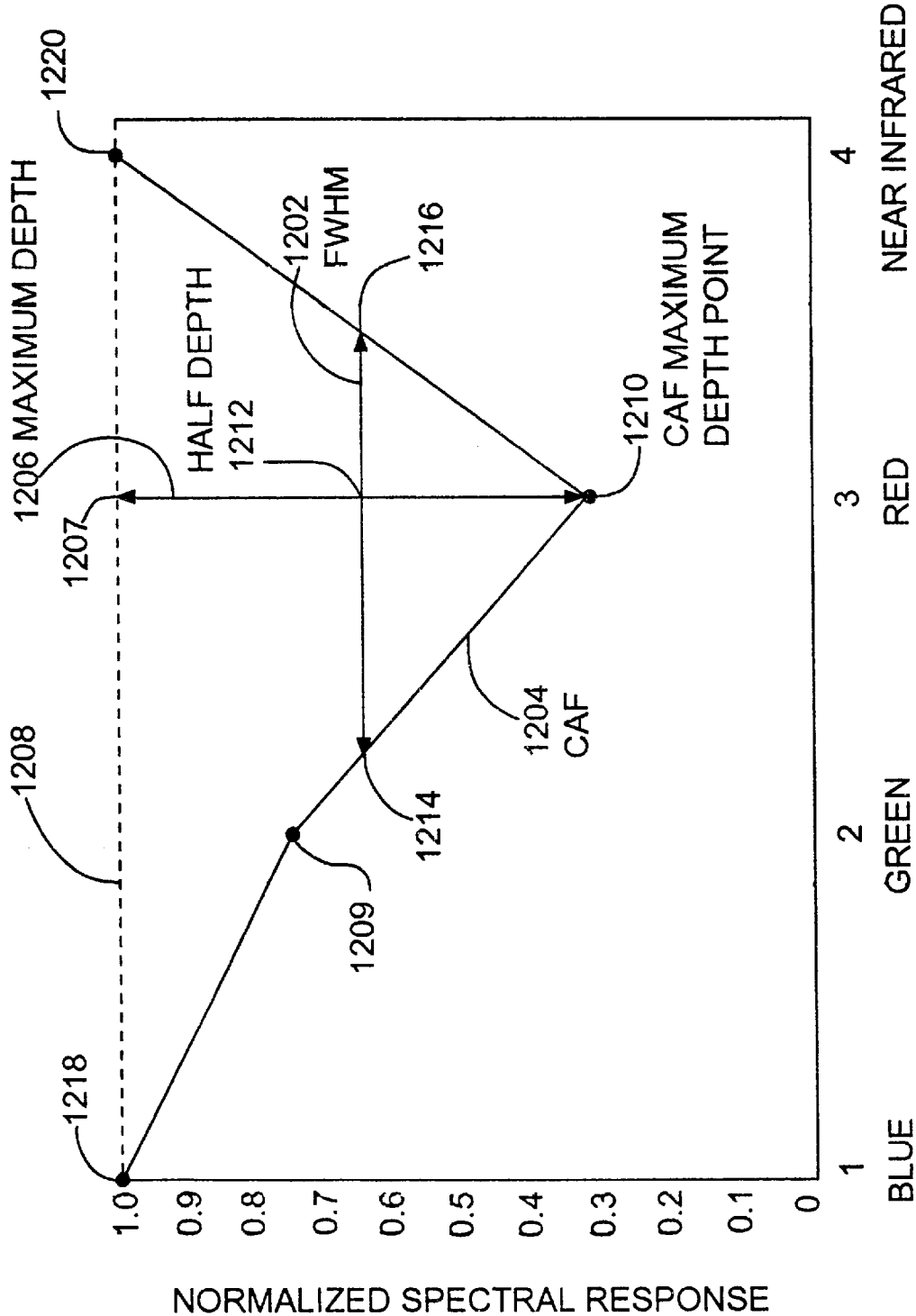
FIG. 12 is a graphical illustration of the chlorophyll absorption feature and the full-width half-maximum measurement.

The preferred embodiment takes advantage of the different response of the green band 123 and the red band 125 to chlorophyll concentrations. The present invention may be presented for analysis is through a chlorophyll-based health map. The chlorophyll-based health map is, in general, a graphical illustration of the manner in which the absorption in the green band varies with respect to the absorption in the red band for a set of CAFs. One way to isolate the varying response of the green and red spectrum is to measure the full-width of the chlorophyll absorption feature at half of its maximum depth. The full width half maximum (FWHM) measurement 1202 is illustrated in FIG. 12. Generally, the FWHM is a measurement of the width of the CAF taken at half of the maximum depth. The maximum depth is the distance from the maximum chlorophyll absorption to the top of the derived background spectral continuum, as described below. Generally, the larger the FWHM value, the greater the chlorophyll concentration and thus the greater the plant health. In the preferred embodiment, the chlorophyll-based health map, as shown in FIG. 14, is a graphical representation of the FWHM measurements for each CAF for each pixel of a given multi-spectral image. The range of FWHM measurements range from a normalized 1 to a normalized 2, where 1 is the most unhealthy case and 2 is the most healthy case.

Referring again to FIG. 3, direct measurement of the spectral absorption for the green band 123 or the red band 125 or both is somewhat indicative of plant health. However, either band by itself is also susceptible to variations due to vegetation cover. This is the same problem encountered by NAVI and SAVI. In other words, a decline in plant cover may be confused with declines in plant health.

Figure 4:
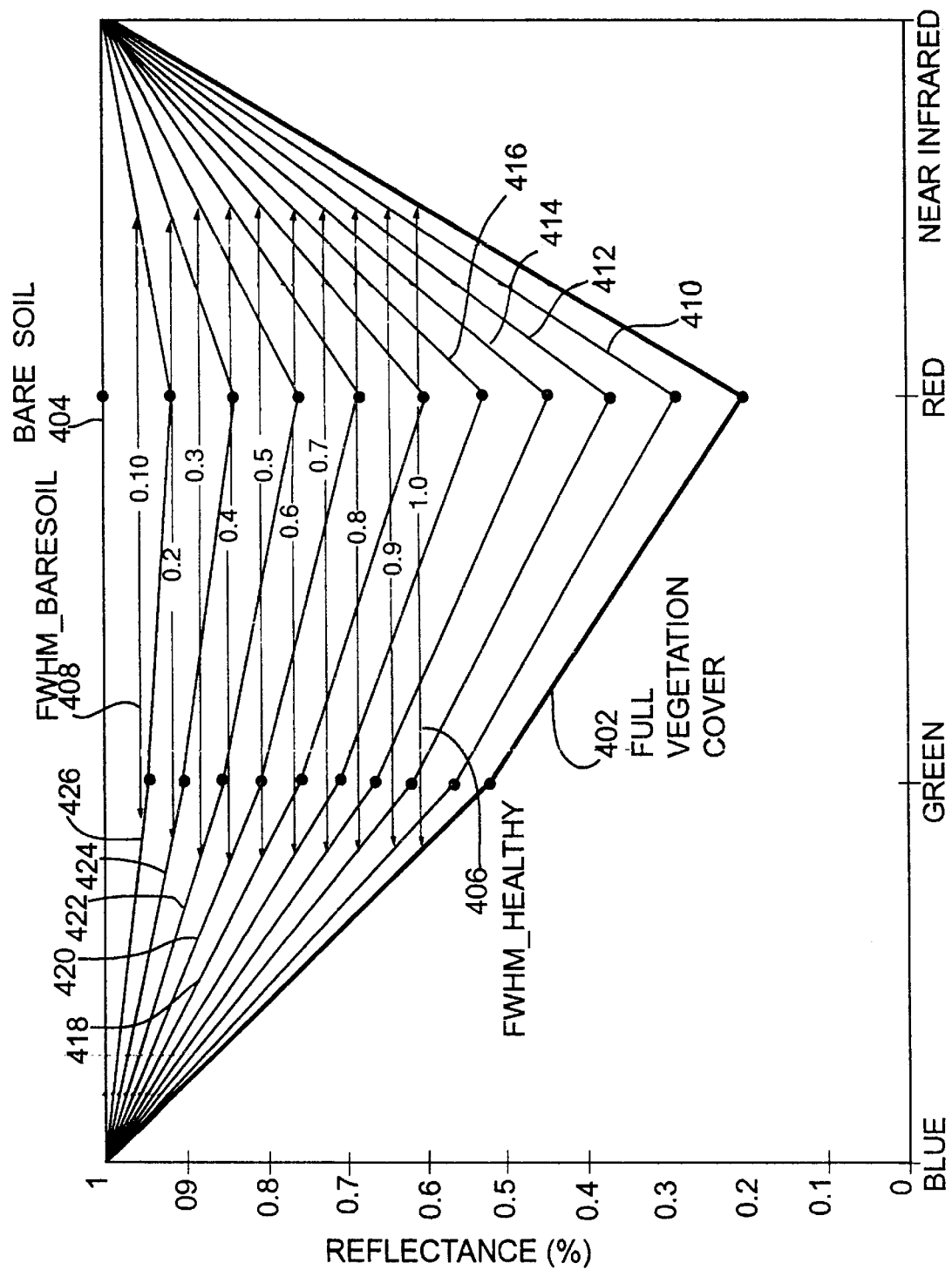
FIG. 4 is a second graphical illustration of a set of chlorophyll absorption features and corresponding full-width half-maximum measurements emphasizing the manner in which the CAF and FWHM vary as vegetation cover changes.

FIG. 4 illustrates how for a very healthy plant the CAFs will change for full vegetation cover CAF 402 to no vegetation cover CAF 404 (i.e.100% soil). The CAFs shown in FIG. 4 represent the chlorophyll absorption of the same healthy plant, while the proportion of soil seen by the digital imaging device is increased until only soil is present in the image. FIG. 4 also illustrates the FWHM for each of the CAFs. The FWHM measurement remains relatively constant from the CAF 402 (FWHM 406) to the CAF 404 (FWHM 408). As FIG. 4 illustrates, the FWHM is relatively insensitive to changes in vegetation cover.

FIG. 3, on the other hand, shows how the FWHM will change greatly from a healthy plant, FWHM 150, to an unhealthy plant, FWHM 152. Thus, the FWHM is effected very little by variations in plant cover, while remaining sensitive to variations in plant health. This is a substantial improvement over other methods of assessing plant health such as NAVI, SAVI, or simply measuring the amount of spectral response in either the green or the red bands.

In addition to the FWHM, the CAF may be analyzed in other ways to provide similar valuable information relating to plant health. First, the surface area circumscribed by the CAF is a useful measure. The surface area is also useful for change analysis. For change analysis, CAFs may be taken for a given area at different times. The surface area of the CAFs may then be compared to determine increases or decreases in health. In addition, a further normalization step can be added where a perfectly healthy plant forms the maximum surface area and a perfectly unhealthy plant forms the minimum surface area scenario. The actual health is then normalized within these constraints.

The angle of the CAF at the green absorption band may also be analyzed. This measure, like the surface area, provides the same robust measure as the FWHM. Also, a comparison of the measurements in just the green spectral band may provide desired valuable information.

Figure 5:
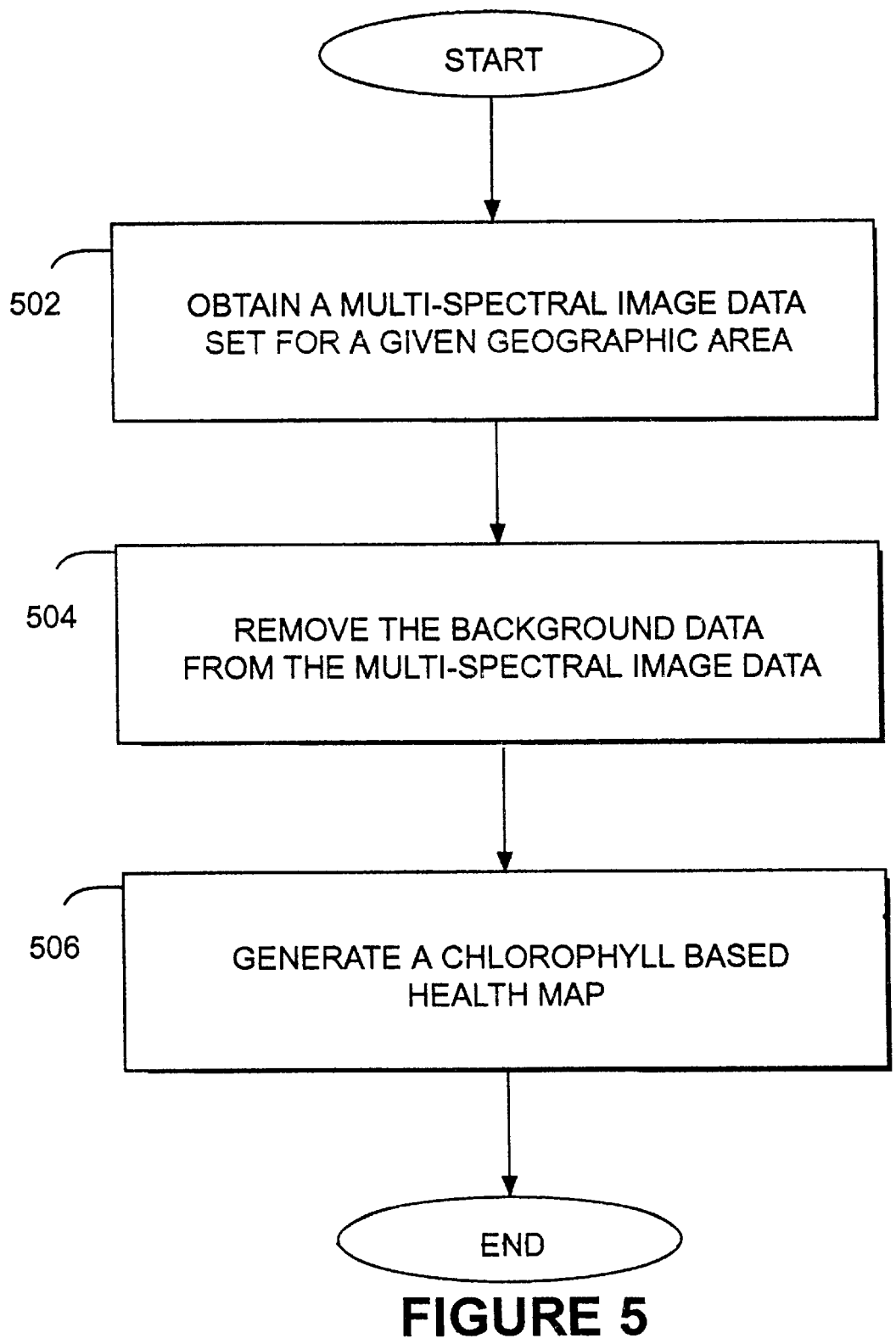
FIG. 5 is flow diagram of the present invention.

FIG. 5 is a flow diagram illustrating the primary functions that are performed in accordance with the present invention. At step 502 a multi-spectral image data set is obtained. The multi-spectral image data set contains information from which the desired chlorophyll data can be derived. The image data is composed of unwanted background data as well as various data relating to CAFS. Background data is generally any data that is not of interest. For example, for the present invention the data of interest is the chlorophyll data. The background data may be soil, rocks, farming equipment, etc.

Referring again to FIG. 5, at step 504 the background data is removed from the multi-spectral image data to create a set of CAFS. Removing the background data isolates the spectral response in the multi-spectral data associated only with the chlorophyll. This step is accomplished through the process of continuum removal that is disclosed above. The CAF is one way to represent the isolated spectral response due to chlorophyll and other ways may be used for each pixel element.

Referring again to FIG. 5, at step 504 the background data is removed from the multi-spectral image data to create set of CAFs. Removing the background data isolates the spectral response in the multi-spectral data associated only with the chlorophyll. This step is accomplished through the process of continuum removal that is disclosed above. The CAF is one way to represent the isolated spectral response due to chlorophyll and other ways may be used for each pixel element.

As also shown in FIG. 5, a chlorophyll based health map is generated at step 506. This may be accomplished by determining the manner in which at least one spectral band that is responsive to chlorophyll varies with respect to at least one other spectral band responsive to chlorophyll. For example, the full-width at the half-maximum depth of each CAF may be determined in order to generate a chlorophyll based health map.

Figure 6:
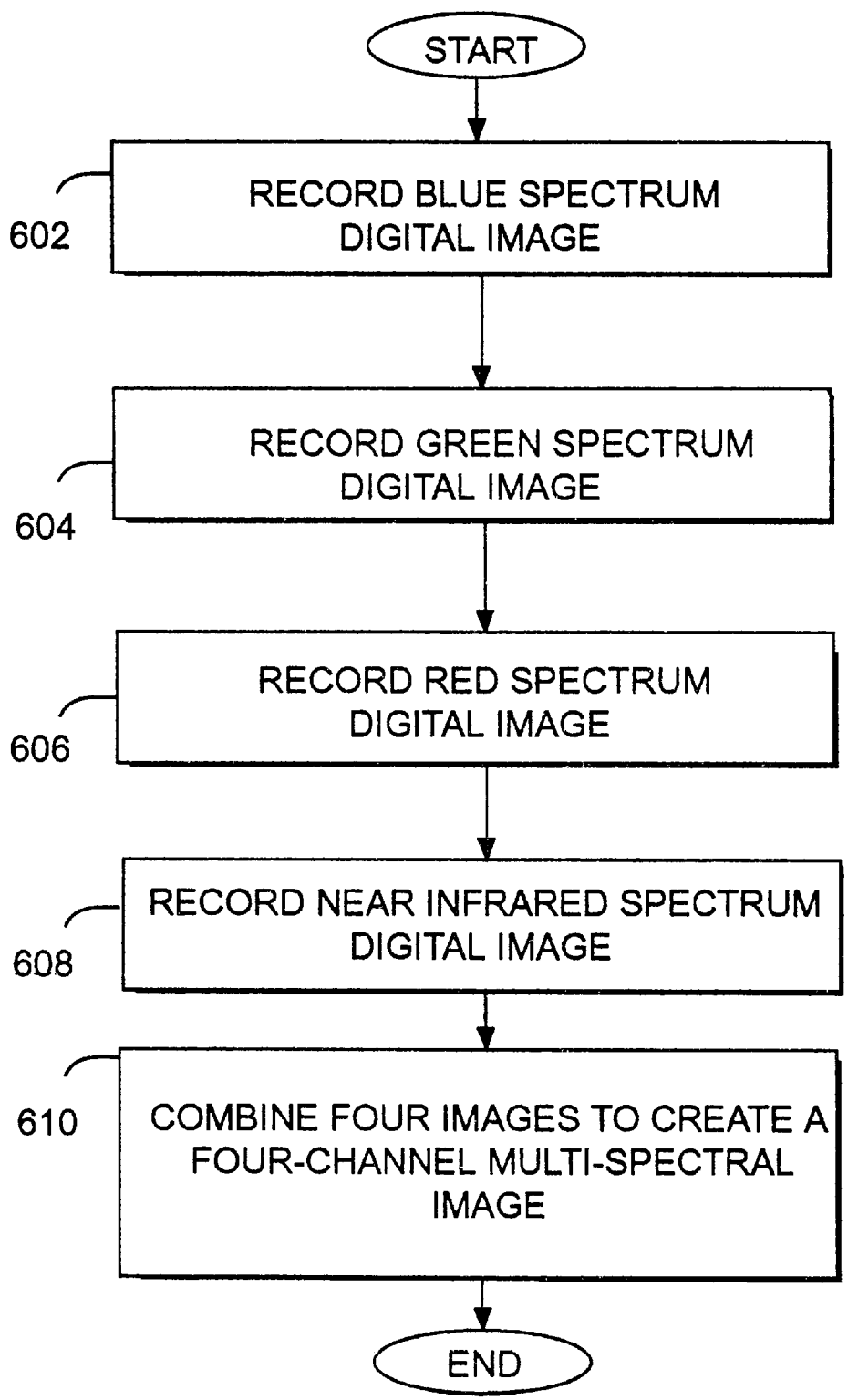
FIG. 6 is a detailed flow diagram of the steps for obtaining a multi-spectral digital image.

FIG. 6 is a flow diagram that describes the basic steps necessary to obtain the multi-spectral image data in accordance with the preferred embodiment. At step 602 a digital image of the blue spectrum of a desired geographic area, such as area 102 (FIG. 1), is recorded. At step 604 a digital image of the green spectrum of the desired geographic area is recorded. At step 606 a digital image of the red spectrum of the desired geographic area is recorded. At step 608 a digital image of the near infrared spectrum of the geographic area is recorded. Finally, at step 610, the blue spectrum, green spectrum, red spectrum, and near infrared spectrum digital images of the same geographic area are combined to create a four-channel multi-spectral image.

Figure 7:
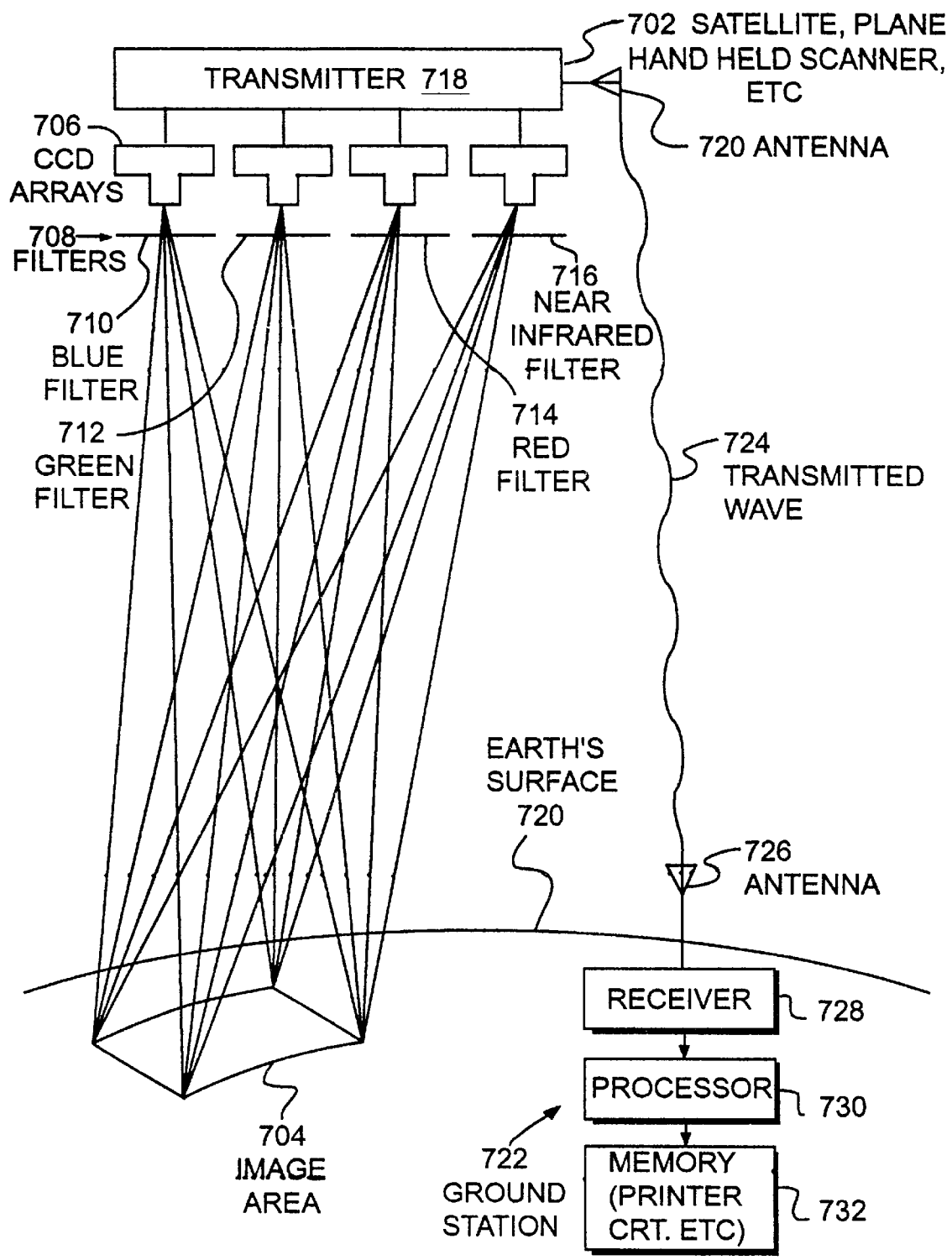
FIG. 7 is an illustration of a system for obtaining a digital image of a given geographical area, transmitting the image data, and processing the image data in accordance with the present invention.

FIG. 7 is a schematic illustration of one implementation for obtaining the image data 502 (FIG. 5). As a satellite airplane, or other elevated device 702 passes over the desired geographic area 704 (i.e. a farmer's field) a digital image is recorded. As illustrated in FIG. 7, four CCD linear arrays 706 are mounted on satellite 702. Each of the four CCD arrays 706 has an associated spectral filter 708. Although CCD arrays, either as linear arrays or matrix arrays, are typically utilized, other types of detectors or sensors can be used. For example, lead sulfide detectors, indium antimonide, and mercury cadmium telluride can be used for progressively higher frequency radiation. High resolution photo-multiplier tubes can also be used as part of the sensor structure. Also, other types of silicon detectors can also be used in addition to CCD type arrays. The array of spectral filters 708 includes a first filter 710 that only allows the 450–540 nanometer spectrum (corresponding to blue light) to pass, a second filter 712 that only allows the 520–600 nanometer spectrum (corresponding to green light) to pass, a third bandpass filter 714 that only allows the 610–680 nanometer spectrum (corresponding to red light) to pass, and a fourth filter 716 that only allows the 780–1000 nanometer spectrum (corresponding to near infrared light) to pass. The CCD arrays 706 record the multi-spectral digital image of the desired geographic area 704 on the earth's surface 720. The multi-spectral image data is coupled to a transmitter 718 that transmits the multi-spectral image data via antenna 720 to a ground station 722 via a transmitted wave 724. Transmitter 718 may include analog to digital converters that convert the multi-spectral image data into binary data for transmission to the ground station 722. Ground station 722 includes an antenna 726 that receives the transmitted wave 724. Antenna 726 is connected to a receiver 728 that processes the signal and applies the signal to processor 730. Processor 730 processes the received signal and generates a chlorophyll-based health map. The processor 730 is coupled to a display device 732 that generates a display of the chlorophyll-based health map. The display may comprise a printer for printing the chlorophyll-based health map, a cathode ray tube for displaying the image, etc. Transmitted wave 724 may comprise either a digital or analog type signal. Error correction processing may be provided in ground station 722 to insure reception of a correct signal from the satellite or airplane, and to correct other problems associated with transmitting digital images from a satellite or airplane.

Figure 8A:
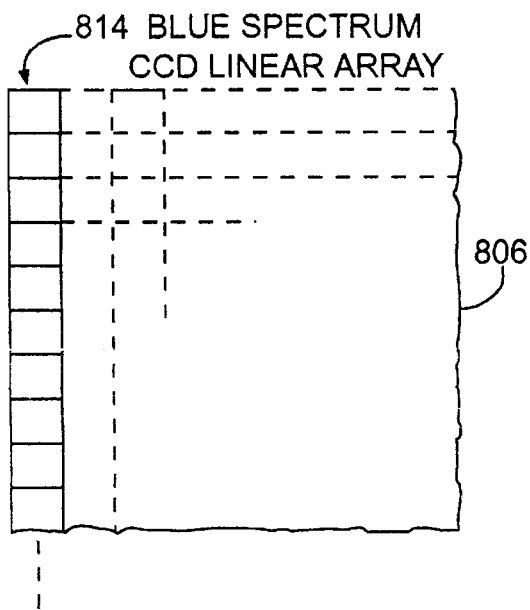
FIG. 8a is an illustration of a blue spectrum CCD Linear Array and a two dimensional matrix that is formed by scanning the CD Linear Array.
Figure 8B:
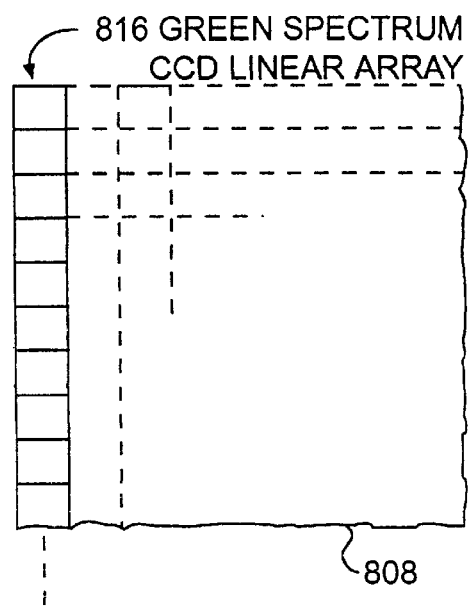
FIG. 8b is an illustration of a green spectrum CCD linear array and a two dimensional matrix that is formed by scanning the CCD linear array.
Figure 8C:
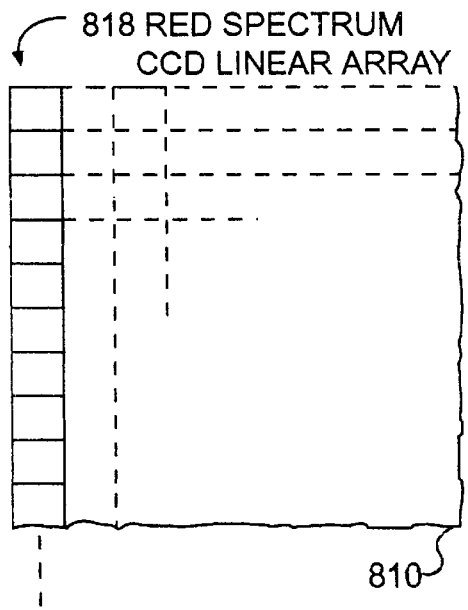
FIG. 8c is an illustration of a red spectrum CCD linear array and a two dimensional matrix that is formed by scanning the CCD linear array.
Figure 8D:
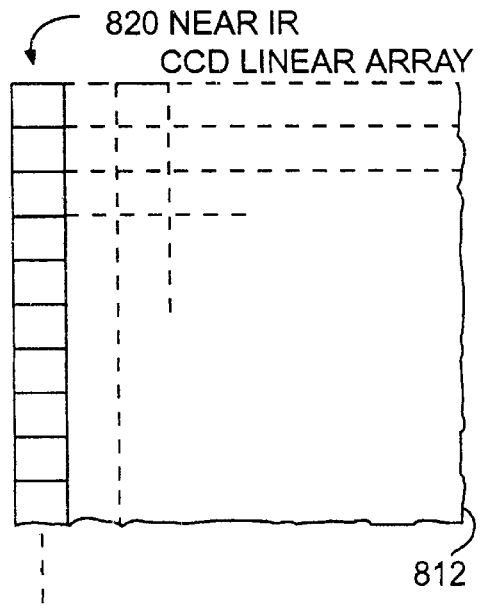
FIG. 8d is an illustration of a near infrared spectrum CCD linear array and a two dimensional matrix that is formed by scanning the CCD linear array.

FIGS. 8A through 8D illustrate the manner in which the four sets of spectral data are obtained in accordance with the present invention. As shown in FIG. 8A, a blue spectrum CCD linear array 814 is scanned across an area to generate a two dimensional pixel array 806 of blue spectrum pixel elements. Each pixel represents a portion of the entire blue spectrum image. For example, in FIG. 1, the farmer's field 102 is shown as a matrix wherein each element of the matrix corresponds to a pixel element of the pixel array 806 for the blue spectrum. Similarly, green spectrum CCD linear array 816 generates a matrix of pixel elements 808 for the green spectrum image. As shown in FIG. 8C red spectrum CCD linear array 818 generates a series of pixel elements 810 that correspond to the red spectrum image. Near infrared CCD linear array 820, as shown in FIG. 8D generates a series of pixel elements 812 that correspond to the near infrared digital image. Each of these digital images 806, 808, 810 and 812 is a two dimensional matrix that corresponds to the matrix illustrated in the farmer's field 102 shown in FIG. 1. As described above, a two dimensional CCD array can also be used, such as those used in a digital camera to record a two dimensional image without the necessity of scanning a linear array. Hence, four spectral images are generated of the same geographic area, such as the farmer's field, for processing in accordance with the present invention.

Figure 9:
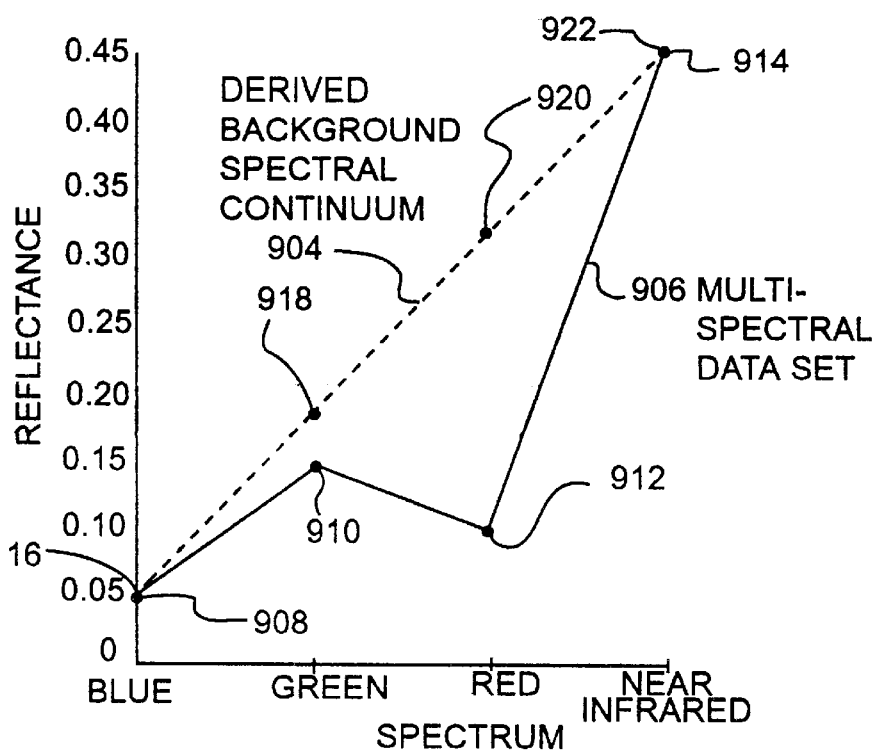
FIG. 9 is a graphical illustration of the multi-spectral data and the background spectral continuum.
Figure 10:
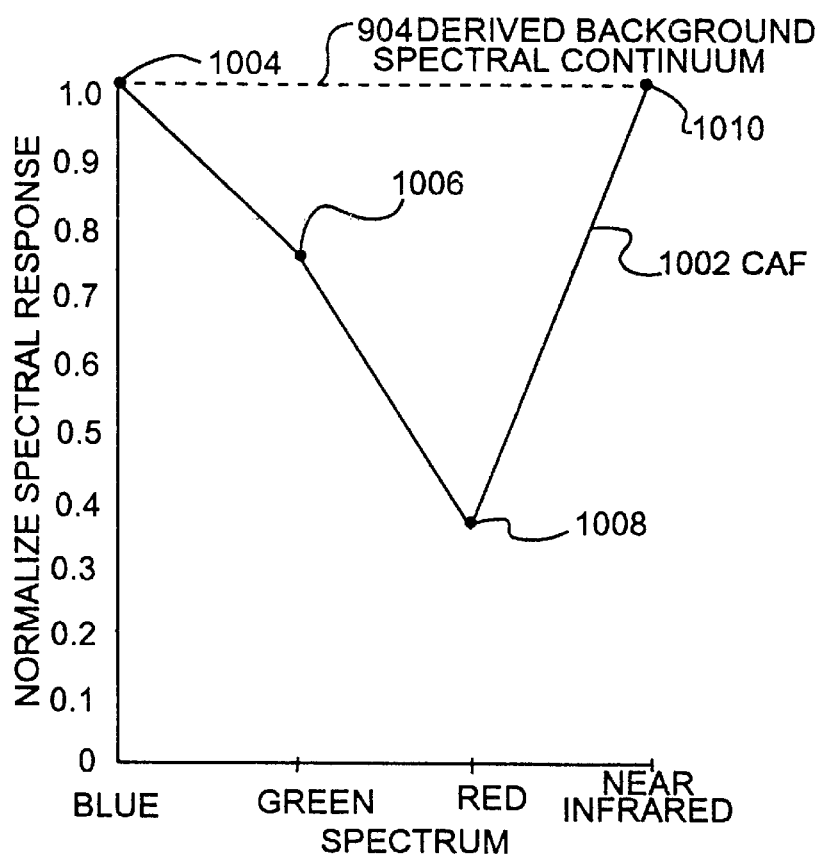
FIG. 10 is a graphical illustration of the chlorophyll absorption feature.

FIGS. 9 and 10 graphically illustrate manner in which the background data is removed from the multi-spectral data set for each multi-spectral image to create a set of CAFs. FIG. 9 generally illustrates the derived spectral continuum 904 (otherwise referred to as background data) and a multi-spectral data set 906. The points 908, 910, 912, and 914 represent the individual values for a multi-spectral data set at the various absorption spectra (blue, green, red, and near infrared). For example, the value of point 908 corresponds to the value of a particular pixel in the linear array 814 (FIG. 8a) for blue spectrum digital image 806 (FIG. 8a). Similarly, the value of point 910 corresponds to the value of a particular pixel in the linear array 816 (FIG. 8b) for the green spectrum digital image 808 (FIG. 8b). The value of point 912 corresponds to the value of a particular pixel of the linear array 818 (FIG. 8c) for the red spectrum digital image 810 (FIG. 8c), and the value of point 914 corresponds to the value of a particular pixel of the linear array 820 (FIG. 8d) of the near infrared digital image 812 (FIG. 8d).

As shown in FIG. 9, the derived background spectral continuum 904 is created by drawing a straight line between point 908 (corresponding to the light absorption in the blue spectrum) and point 914 (corresponding to the light absorption in the near infrared spectrum). There is very little or no absorption due to chlorophyll at points 908 (blue spectrum) and 914 (near infrared spectrum). However, at point 910 (green spectrum) and point 912 (red spectrum) there is absorption due to chlorophyll. Therefore, a straight line between point 908 and point 914 derives an estimate of what the absorption for point 910 (green spectrum) and point 912 (red spectrum) is without absorption due to chlorophyll, i.e. the value at point 918 estimates absorption in the green spectrum due to everything but chlorophyll, the value at point 920 estimates absorption in the red spectrum due to everything but chlorophyll. The points 916, 918, 920, and 922 correspond to points at the same spectra as the multi-spectral data set points 908, 910, 912, and 914.

In addition to using the straight-line method to derive the background spectral continuum, discussed above, other methods are possible to obtain a background spectral continuum. One method is to use measured background data. The measured data could be generally representative of the background. For example, an image could be taken of a general geographical area without any vegetation cover. The background data could also be obtained for the specific geographic area of interest such as by recording the spectral response of the specific plot of land before any planting takes place. Also, discrete background components (i.e. soil, rock, water, man-made structures, farming equipment, etc.) could be analyzed to determine their spectral reflectance and the discrete reflectance values could be combined per equation (3) to obtain a background spectral continuum. The background spectral continuum may also be derived via the Convex Hull Fit algorithm.

As shown in FIG. 10, CAF 1002 is derived from the background spectral continuum 904 and the multi-spectral data set 906. The CAF 1002 represents one pixel of one multi-spectral data set. To obtain the CAF 1002, the points 908, 910, 912 and 914 are divided by the corresponding points 916, 918, 920, and 922, respectively. For example, the value of point 1004 is calculated by dividing the value of point 908 (0.05) by the value of point 916 (0.05) to equal 1.0 (point 1004). The value of point 1006 is calculated by dividing the value of point 910 (0.15) by point 918 (0.20) to equal 0.75 (point 1004). Each pixel response represents the product of a many different absorbers (see equation 3). Therefore, in order to determine the spectral absorption due only to chlorophyll all of the non-pertinent (background absorbers) must be divided out (see equation 4).

Figure 11:
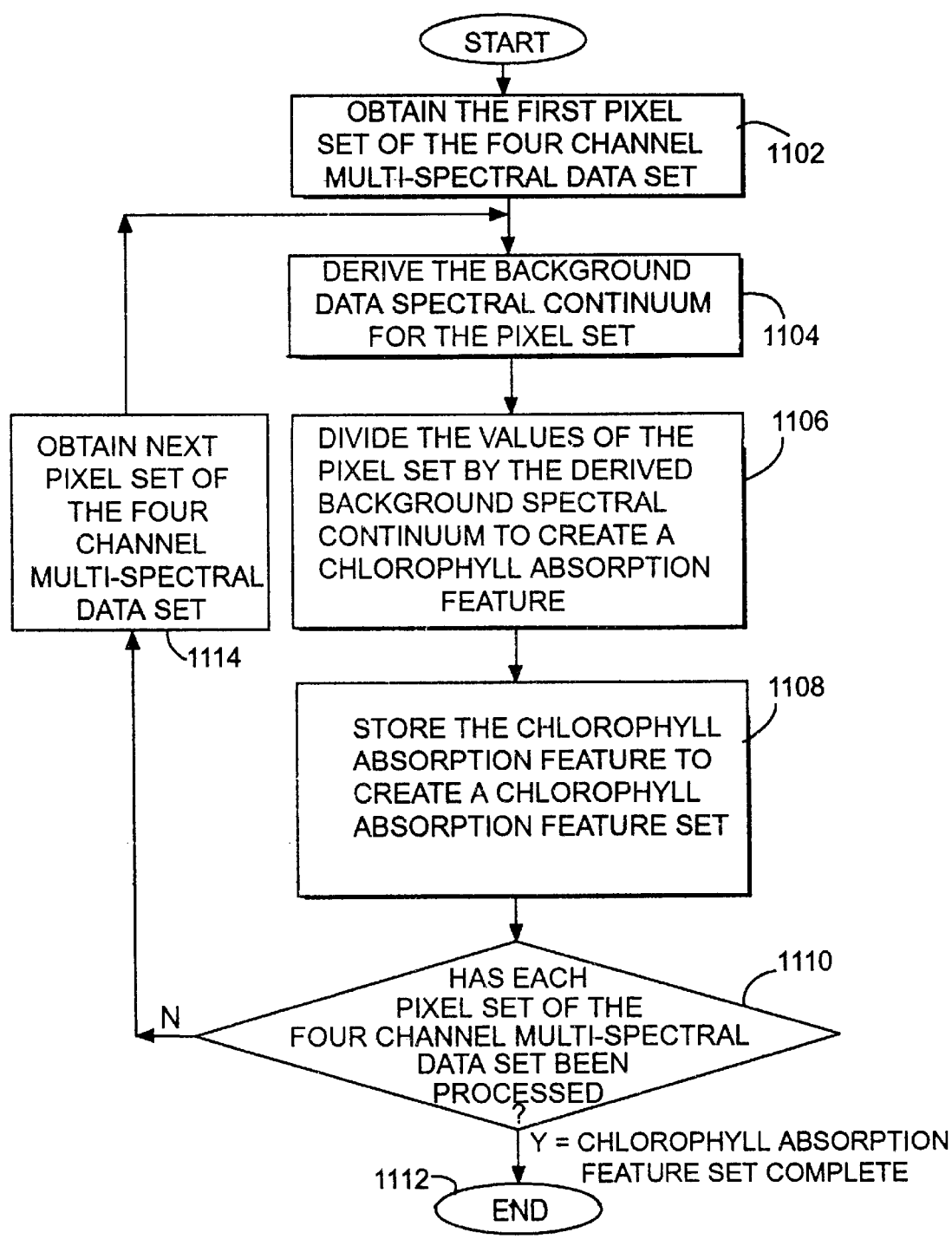
FIG. 11 is a detailed flow diagram of the steps for deriving the chlorophyll absorption feature.

FIG. 11 is a flow diagram that illustrates the function of removing the background data from the multi-spectral data set for each set of corresponding multi-spectral image pixels to create a set of CAFs. At step 1102 the first pixel set of the four channel multi-spectral data set is obtained. At step 1104 the background spectral continuum for the pixel set is derived in accordance with the method described above (FIG. 9 and discussion). At step 1106 the value of the pixel set is divided by the value of the derived background spectral continuum in accordance with the method described above (FIG. 10 and discussion). The result of the division step in 1106 is the generation of CAF. Referring to FIGS. 9 and 10, to obtain the CAF 1002 the points 908, 910, 912 and 914 are divided by the corresponding points 916, 918, 920, and 922. At step 1108 the CAF generated by step 1106 is stored to create a set of CAFs. The next step 1110 determines if each pixel of the four-channel multi-spectral image has been processed. If all of the data sets have not been processed, the next multi-spectral pixel set is retrieved 1114 and is processed the same as the first pixel set beginning at step 1104. If all data sets have been processed, then the formation of the CAF set is complete, as indicated at step 1112.

FIG. 12 graphically illustrates the manner is which a FWHM 1202 value is determined. Line 1204 refers to a CAF. The CAF 1204 is similar to CAF THREE 135 of FIG. 3. Moreover, the FWHM 1202 is similar to FWHM 154 of FIG. 3. The FWHM is determined by finding the maximum depth 1206 of the CAF. The maximum depth 1206 for this CAF 1204 is the distance from the point 1207 on the derived background spectral continuum 1208 to the deepest point 1210 (corresponding to the greatest chlorophyll absorption). Following a determination of the maximum depth 1206, the half point 1212 is determined. Next the full width 1202 is determined at the half point 1212 of the maximum depth 1206. The full width corresponds to the width of the CAF 1204 from the point on the CAF 1204, shown at 1214, to the point on the CAF 1204, shown at 1216. The FWHM is determined for each CAF, i.e., each pixel. The resulting set of FWHM measurements is used to form the chlorophyll-based health map. Creating the chlorophyll-based health map in the same arrangement as the original four-channel multi-spectral data set allows an image to be created that takes the shape of the original image.

The absorption in the green spectrum 1209 due to chlorophyll is a function of both a and b types of chlorophyll.

The absorption in the red spectrum 1210 is a function of only type a chlorophyll which is the dominant type of chlorophyll. The shape of CAF 1204 will vary as the amount of the different types of chlorophyll vary in the plant. The FWHM is only one possible measurement that combines the different absorption characteristics in the green and red spectrum due to chlorophyll. Referring back to FIG. 4, if the surface area for the CAF 402, which corresponds to a healthy plant, is compared to each successive CAF (410, 412, 414, 416, 418, 420, 422, 424, 426, and bare soil 404) the difference is roughly linear. This is because the green and red spectral response is only changing due to increasing soil content in the image. Referring back to FIG. 3, the surface area of CAF ONE 133 compared to each successive CAF (134, 135, 136, 138, 140, 142, and 144) is not linear. This is indicative of the different absorptions in the green and red spectral due to chlorophyll content which is a direct indicator of the health of the plant.

To further reduce the effect of vegetation cover, a measurement such as the Leaf Area Index ("LAI") may be incorporated with the preferred embodiment of the present invention. LAI represents the ratio of the leaf area to the total area (soil area). Combining the present invention with LAI further reduces sensitivity to vegetation cover, and the growth stage of the plant to further focus on plant health.

Figure 13:
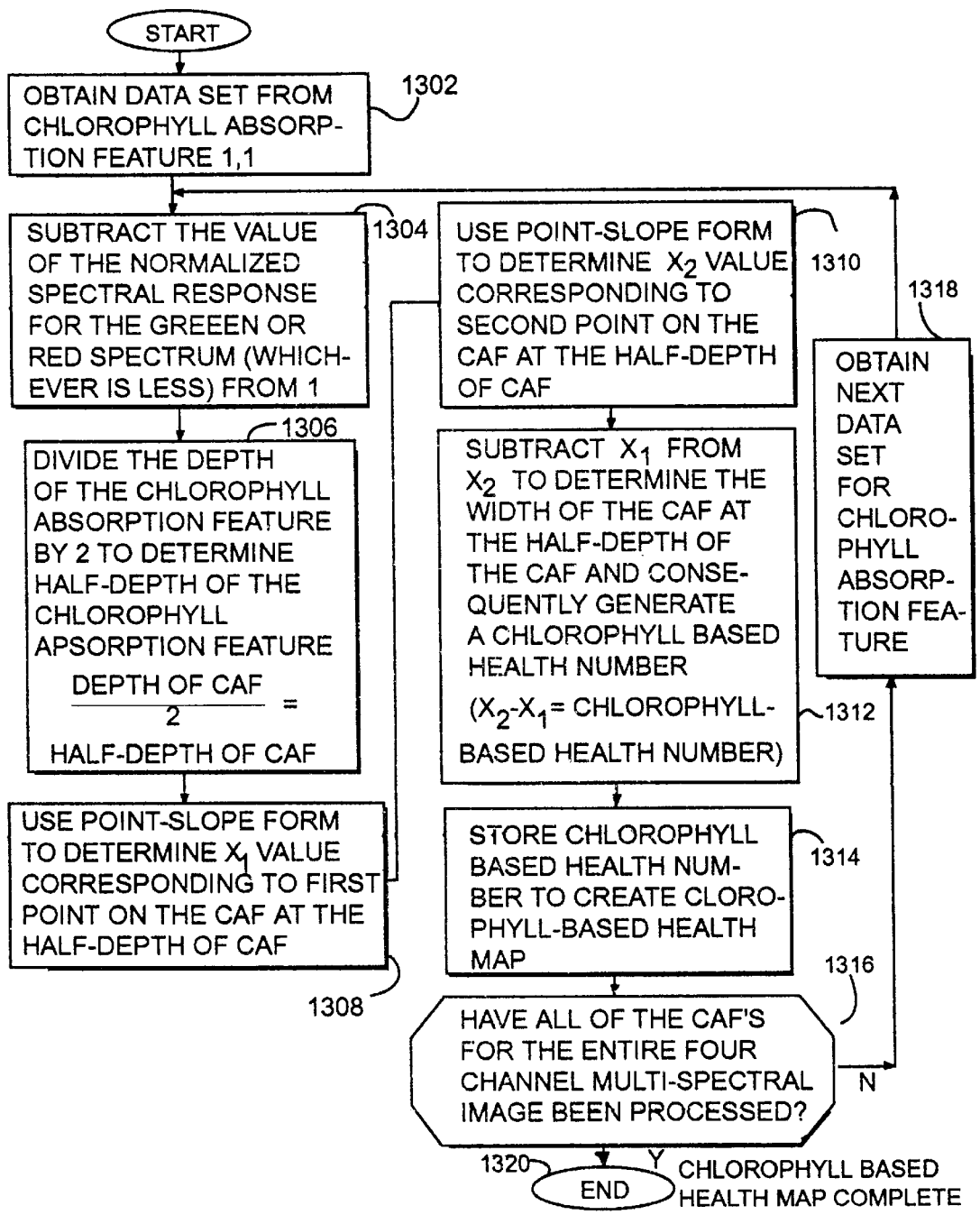
FIG. 13 is a detailed flow diagram of the steps for determining the full-width half-maximum measurement.

FIG. 13 is a detailed flow diagram for the steps for determining the FWHM and the chlorophyll-based health map. At step 1302 the first CAF data set is obtained. Referring back to FIG. 11, the first CAF data set is the first CAF stored at step 1108. At step 1304 the value of the normalized spectral response for the green spectra and the red spectra, whichever is less, is subtracted from one. As seen at the dotted line 1208 of FIG. 12, the value is subtracted from one because the normalized spectral response in the preferred embodiment corresponding to both the blue and near infrared spectral response is one. At step 1306 the maximum depth of the CAF determined at step 1304 is divided by 2 to determine the half depth of the CAF. At step 1308 the point-slope form is used to determine the first point (e.g. point 1214 of FIG. 12) on the CAF corresponding to the half depth of the CAF. The point-slope form refers to the equation:

(5) Point-Slope Form:

$$y-y_o=m(x-x_o);$$

where (x,y)=first point $(x_o,y_o)$=second point m=slope of line connecting first point and second point At step 1310 the point-slope form is used to determine the second point (e.g. point 1216 of FIG. 12) on the CAF corresponding to the half depth of the CAF. At step 1312 the first point 1214 is subtracted from the second point 1216 to determine the FWHM for the CAF. At step 1314 the FWHM is stored to generate a set of FWHM numbers, which when complete, are the pixel intensities for the chlorophyll based health map. At step 1316 a check is made to determine if all of the CAFs have been processed to generate the complete set of FWHM numbers. If not, the next CAF is retrieved at step 1318 and the process starts over at step 1304. If all of the CAFs have been processed a complete set of FWHM numbers is obtained, which, when complete, is the complete set of pixels for the chlorophyll based health map image.

Figure 14G:
FIGS. 14a–i is a representation of a chlorophyll based health map [s].
Figure 14H:
Figure 14I:
Figure 14D:
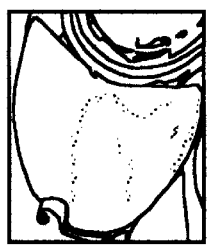
Figure 14E:
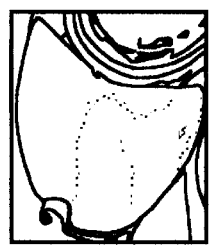
Figure 14F:
Figure 14A:
Figure 14B:
Figure 14C:

FIGS. 14a through 14i illustrate the advantages of the present invention. FIGS. 14a, 14b, and 14c illustrate false color composites of a particular field located at Moses Lakes, Wash. FIG. 14a is false color composite of the field on Jul. 22, 1997. FIG. 14b is a false color composite of the field on Jul. 28, 1997, while FIG. 14c is a false color composite of the field on Aug. 4, 1997. The false color composite signals provide an output that is a function of both the aggregate amount of plant material together with indications of chlorophyll content of the plants. The false color composite is very similar to the well known color infrared photography. False color composite is an indication of the biomass plant matter in a particular area, i.e., the plant content. False color composite signals are generated from the near IR which represents the red spectrum in the signal, red which is indicated by the green in the color composite and green which is represented by blue in the color composite. In this manner, the false color composite illustrations of FIGS. 14a, 14b and 14c are similar to indices such as NDVI and SAVI. As can be seen from the chronological progression of the false color composite signal shown in FIGS. 14a, 14b, and 14c, there is very little or no indication of any problems with the health of the plants shown in the fields over the time period indicated.

FIGS. 14d, 14e, and 14f comprise a chlorophyll based health map that is generated in accordance with the present invention. FIG. 14d was recorded on Jul. 22, 1997, while FIG. 14e was recorded on Jul. 28, 1997, and FIG. 14f was recorded on Aug. 4, 1997 which corresponds to the dates of FIGS. 14a, 14b, and 14c, respectively. As can be seen from FIGS. 14d, 14e, and 14f, the chlorophyll based health map clearly indicates the areas of diminished health which are indicated in yellow. Generally, the color scheme for each of these drawings is that the green represents from the midpoint of the distribution curve to plus one sigma, indicating positive health of the plants, while red indicates from the middle of the distribution curve to minus one sigma, indicating negative health. Blue represents positive health above plus one sigma, while yellow indicates negative health below minus one sigma. As shown in FIGS. 14d, 14e, and 14f, the yellow portions of the chlorophyll based health map increase sequentially over time. As can be clearly seen from the sequence of chlorophyll based health maps illustrated in FIGS. 14d through 14f, these chlorophyll based health maps provide an early indication of weakened health as well as a clear indication of the location and progression of these health anomalies.

FIGS. 14g, 14h, and 14i comprise a series of change maps that indicate the change in the chlorophyll based health map. For example, FIG. 14g may indicate the change between a previous chlorophyll based health map and FIG. 14d. Similarly, FIG. 14h may indicate the change in the chlorophyll based health map between FIGS. 14d and 14e. In the same manner, FIG. 14i indicates the change between FIGS. 14e and 14f. These change maps provide a clear indication of the manner and rate in which the health of these plants is changing.

The color images are presented to enhance the understanding of the invention. However, processing of the data is not limited to visual interpretation of color images as described above. Rather, the data provided by the invention may be displayed in any desired fashion.

In addition to assessing plant health for use by a farmer, the present invention is useful in many other applications such as forestry, environmental monitoring and assessment, resource exploration, and sustainable development.

In forestry, the present invention may be used to assess forest health and productivity. As in agriculture, the present invention may allow for early detection and correction of health-related problems. In addition, it may be possible to assess forest product quality and yield for selective cutting. The present invention may also be useful for fuel-load monitoring/mapping which is important to early prediction of forest fires, minimizing risk to human life and property loss and improving forest management.

In environmental monitoring and assessment, as the development and health of vegetation is directly related to its environment (e.g. soil, water), many surface or subsurface environmental problems manifest themselves symptomatically through vegetation. Thus, remote sensing and extraction of vegetation biophysical parameters (through the use of the present invention) can lead to early detection and mapping of various environmental problems including surface water/groundwater or soil contamination such as by metals, caustic agents, volatile/chlorinated organic compounds, etc. This can improve the efficiency of environmental site analysis, lowering planning and remediation costs.

In resource exploration, vegetation analysis through use of the present invention may be employed in natural resource exploration (e.g. mining, oil, and gas). Sulfide mineral deposits often cause stress in overlying vegetation due to leaching of sulfuric acid and heavy metals in groundwater. Similarly, oil and gas seeps or pipeline leaks may be detected and mapped through measurements of plant health deviations.

In sustainable development (i.e. equitable, efficient, and mindful use of resources for long-term economic and cultural growth) the present invention may provide a value capability for assessing natural capital, resource development planning and monitoring of distribution (e.g., water rights monitoring).

The foregoing description of the invention has been presented for purposes of illustration and description. It is not intended to be exhaustive or to limit the invention to the precise form disclosed, and other modifications may be possible in light of the above teachings. For example, the surface area of the CAF or the angle of the CAF at the green band may be utilized to determine plant health. Additional bands may be utilized to further enhance the invention. The invention may be used for change analysis and/or in scene analysis. The invention may include the use of the LAI to further reduce the effects of vegetation cover on chlorophyll analysis. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A method for generating a chlorophyll-based health map for a geographic area comprising the steps of:

obtaining a multi-spectral image data set for said geographical area, said multi-spectral image data set including at least one spectra that responds to chlorophyll and at least two spectra that respond to background data;

removing said background data from said multi-spectral image data set to create a chlorophyll absorption data set;

determining an amount of chlorophyll in said geographic area represented by said chlorophyll absorption data set; and said obtaining step comprising the steps of;

obtaining a digital image of the blue spectral band for said geographic area that is comprised of a set of pixels wherein each pixel represents the reflectance value for said blue spectral band;

obtaining a digital image of the green spectral band for said geographic area that is comprised of a set of pixels wherein each pixel represents the reflectance value for said green spectral band;

obtaining a digital image of the red spectral band for said geographic area that is comprised of a set of pixels wherein each pixel represents the reflectance value for said red spectral band;

obtaining a digital image of the near infrared spectral band for said geographic area that is comprised of a set of pixels wherein each pixel represents the reflectance value for said near infrared spectral band; and combining said digital image of the blue spectral band, said digital image of the green spectral band, said digital image of the red spectral band, and said digital image of the near infrared digital image to create a multi-spectral data set.

2. The method of claim 1, wherein said removing step further comprises the steps of:

deriving a background data spectral continuum set for said multi-spectral image data set that has a reflectance value for said blue spectral band digital image, a reflectance value for said green spectral band digital image, a reflectance value for said red spectral band digital image, and a reflectance value for said near infrared spectral band digital image, such that said background data for each said spectral continuum set does not contain chlorophyll absorption data;

dividing said digital image for the blue spectral band by said background data spectral continuum set to create a set of blue spectrum chlorophyll absorption numbers;

dividing said digital image for the green spectral band by said background data spectral continuum set to create a set of green spectrum chlorophyll absorption numbers;

dividing said digital image for the red spectral band by said background data spectral continuum set to create a set of red spectrum chlorophyll absorption numbers;

dividing said digital image for the near infrared spectral band by said background data spectral continuum set to create a set of near infrared spectrum chlorophyll absorption numbers; and combining said set of blue chlorophyll absorption numbers, said set of green chlorophyll absorption numbers, said set of red chlorophyll absorption numbers, and set of said near-infrared chlorophyll absorption numbers to create said chlorophyll absorption data set.

3. The method of claim 1 wherein said blue spectral band is located between about 450–530 nanometers, said green spectral band is located between about 520–610 nanometers, said red band is located between about 640–720 nanometers, and said infrared band is located between about 770–880 nanometers.

4. A method of generating a chlorophyll-based health map of a geographic area having both chlorophyll geographic areas and non-chlorophyll geographic areas, comprising the steps of:

obtaining a multi-spectral image of said geographical area, said multi-spectral image including at least one spectra that responds to changes in chlorophyll concentration and at least two spectra that are relatively unresponsive to changes in chlorophyll concentration;

removing said at least two unresponsive spectra from said multi-spectral image in a manner to create a normalized spectra that varies with chlorophyll concentration;

determining an amount of chlorophyll in said chlorophyll geographic areas as a function of said normalized spectra; and generating a chlorophyll-based health map of said geographic area as a function of said determining step.

5. The method of claim 4 wherein a first of said at least two unresponsive spectra is a higher spectra than said at least one responsive spectra, and wherein a second of said at least two unresponsive spectra is a lower spectra than said at least one responsive spectra.

6. The method of claim 5 wherein said first of said at least two unresponsive spectra is at about 650 nanometers, wherein said at least one responsive spectra is at about 550 nanometers, and wherein said second of said at least two unresponsive spectra is at about 470 nanometers.

7. The method of claim 4 wherein said determining step further comprises the steps of;

generating chlorophyll absorption features as a function of said normalized spectra; and measuring the full width at half the maximum depth of said chlorophyll absorption features.

8. The method of claim 4 wherein said determining step further comprises the steps of:

determining a surface area of a first chlorophyll absorption feature that corresponds to a control plant; and comparing said chlorophyll absorption features to said first chlorophyll absorption feature.

9. The method of claim 4 wherein said determining step further comprises the steps of:

determining a surface area of a first chlorophyll absorption feature for said geographic area;

determining a surface area of a second chlorophyll absorption feature for said geographic area that is obtained at a different point in time than said first chlorophyll absorption feature is obtained; and comparing said first chlorophyll absorption feature to said second chlorophyll absorption feature.

10. The method of claim 4 wherein said determining step further comprises the steps of:

determining a surface area of a first chlorophyll absorption feature for said geographic area;

determining a surface area of a second chlorophyll absorption feature for said geographic area; and comparing said first chlorophyll absorption feature to said second chlorophyll absorption feature.

11. A method for generating a chlorophyll-based health map for a geographic area comprising the steps of:

obtaining a multi-spectral image data set for said geographical area, said multi-spectral image data set including at least one spectra that responds to chlorophyll and at least two spectra that respond to background data;

removing said background data from said multi-spectral image data set to create a chlorophyll absorption data set;

determining an amount of chlorophyll in said geographic area represented by said chlorophyll absorption data set; and said obtaining step comprising the steps of;

obtaining a digital image of the spectral band located between about the 450–530 nanometer wavelength for said geographic area;

obtaining a digital image of the spectral band located between about the 520–610 nanometer wavelength for said geographic area;

obtaining a digital image of the spectral band located between about the 640–720 nanometer wavelength for said geographic area; and obtaining a digital image of the spectral band located between about the 770–880 nanometer wavelength for said geographic area.

12. A process for generating a chlorophyll-based health map of a geographic area, comprising the steps of:

obtaining a multi-spectral image of said geographic area;

said multi-spectral image including a first spectral band that is absorbed by both chlorophyll-containing material and non-chlorophyll-containing material, said multi-spectral image including a second spectral band that is absorbed by both chlorophyll-containing material and non-chlorophyll-containing material differently than said first spectral band is absorbed by both chlorophyll-containing material and non-chlorophyll-containing material;

removing absorption due to non-chlorophyll material from said first spectral band to thereby form a modified first spectral band;

removing absorption due to non-chlorophyll material from said second spectral band to thereby form a modified second spectral band;

determining a manner in which said modified first spectral band varies with respect to said modified second spectral band; and generating said chlorophyll-based health map of said geographic area as a function of said determining step.

13. A computer system that is programmed to generate a chlorophyll-based health map of a geographic area, comprising:

means for obtaining a multi-spectral image of said geographical area;

said multi-spectral image including at least one spectra having a response to chlorophyll;

said multi-spectral image having at least two spectra that are relatively unresponsive to chlorophyll;

means for removing said at least two spectra from said multi-spectral image in a manner to create a normalized spectra that varies with chlorophyll content;

means responsive to said normalized spectra for providing chlorophyll absorption features; and means responsive to said chlorophyll absorption features for generating said health map of said geographic area.

14. The computer system of claim 13 wherein a first of said at least two spectra is a higher spectra than said at least one spectra, and wherein a second of said at least two spectra is a lower spectra than said at least one spectra.

15. The computer system of claim 14 wherein said first of said at least two spectra is at about 650 nanometers, wherein said at least one spectra is at about 550 nanometers, and wherein said second of said at least two spectra is at about 470 nanometers.

16. A process for generating a substance-based spectral absorption map of a geographic, comprising the steps of:

obtaining a multi-spectral image of said geographic area;

said multi-spectral image comprising a plurality of multi-spectral data sets;

each multi-spectral data set including substance-based spectral absorption and background-based spectral absorption;

eliminating said background-based spectral absorption from each of said plurality of multi-spectral image data sets to thereby create a plurality of substance absorption features;

determining a half depth of each of said plurality of substance-absorption-features;

determining a half depth width of each of said plurality of substance-absorption-features; and using said half depth determinations and said half depth width determinations to create said substance-based spectral absorption map of said geographic area.

17. A computer system programmed to generate a chlorophyll-based health map of a geographic area, comprising:

sensors for obtaining a multi-spectral image of said geographic area;

said multi-spectral image including at least one spectra that responds primarily to chlorophyll absorption;

said multi-spectral image including at least two spectra that respond primarily to non-chlorophyll absorption;

a processor receiving said multi-spectral image and operating to remove said at least two spectra in a manner to generate a normalized spectra that varies with chlorophyll absorption; and a display connected to said processor and responsive to said normalized spectral for displaying said chlorophyll-based health map of said geographic area.

18. Apparatus for generating a chlorophyll-based health map of a geographic area, comprising:

first sensing means viewing said geographic area and providing a digital image of the blue spectral band for said geographic area that is comprised of a set of pixels wherein each pixel represents the reflectance value for said blue spectral band;

second sensing means viewing said geographic area and providing a digital image of the green spectral band for said geographic area that is comprised of a set of pixels wherein each pixel represents the reflectance value for said green spectral band;

third sensing means viewing said geographic area and providing a digital image of the red spectral band for said geographic area that is comprised of a set of pixels wherein each pixel represents the reflectance value for said red spectral band;

fourth sensing means viewing said geographic area and providing a digital image of the near infrared spectral band for said geographic area that is comprised of a set of pixels wherein each pixel represents the reflectance value for said near-infrared spectral band;

first processing means connected to said first, second, third and fourth sensing means, and operating to combine said digital image of the blue spectral band, said digital image of the green spectral band, said digital image of the red spectral band, and said digital image of the near infrared digital image, to thereby create a multi-spectral data set, said multi-spectral image data set including spectra that responds to chlorophyll and spectra that respond to background data;

second processing means connected to said first processing means and operating to remove said spectra responsive to background data from said multi-spectral image data set, to thereby create a chlorophyll absorption data set;

third processing means connected to said second processing means and operating to determine an amount of chlorophyll in said geographic area as represented by said chlorophyll absorption data set; and means connected to said third processing means for generating said chlorophyll-based health map of said geographic area.

19. Apparatus for generating a chlorophyll-based health map of a geographic area, comprising:

first sensing means for viewing said geographic area and obtaining a digital image of said geographic area that is located between about the 450–530 nanometer wavelength;

second sensing means for viewing said geographic area and obtaining a digital image of said geographic area that is located between about the 520–610 nanometer wavelength;

third sensing means for viewing said geographic area and obtaining a digital image of said geographic area that is located between about the 640–720 nanometer wavelength; and fourth sensing means for viewing said geographic area and obtaining a digital image of said geographic area that is located between about the 770–880 nanometer wavelength;

first processing means connected to said first, second, third and fourth sensors and providing a multi-spectral image data set for said geographical area, said multi-spectral image data set including at least one spectra that responds to chlorophyll and at least two spectra that respond to background data;

second processing means connected to said first processing means and operating to remove at least two spectra from said multi-spectral image data set, to thereby create a chlorophyll absorption data set; and third processing means connected to said second processing means and operating to generating said chlorophyll-based health map as a function of said chlorophyll-absorption data set.

* * * * *